UNITED STATES PATENT OFFICE.

ANDRES BALAGUER, OF MARIANAO, HABANA, CUBA.

VEHICLE WHEEL.

1,427,429.  Specification of Letters Patent.  Patented Aug. 29, 1922.

Application filed May 6, 1919. Serial No. 295,232.

*To all whom it may concern:*

Be it known that I, ANDRES BALAGUER, a citizen of the Republic of Cuba, and resident at Marianao, Province of Habana, Republic of Cuba, have invented certain new and useful Improvements in Vehicle Wheels Provided with Pneumatic Tires, of which the following is a specification.

This invention relates to automobile or other vehicle wheels provided with pneumatic tires. An object of this invention is to provide a construction of tire carrying rim, which is transportable together with the tire previously arranged thereon, and in which the tire with the inner tube can be easily mounted or removed.

Another object of this invention is to provide a special construction of wheel on which can be easily mounted or removed a demountable rim carrying a pneumatic tire and its inner tube, and which is provided with locking and protecting means for the demountable rim.

And stilll a further object of this invention is to provide a special construction of pneumatic tire provided with special re-enforcing and protecting means for the inner air tube, so as to prevent its puncturing, or at least to make it quite difficult.

Figure 1:
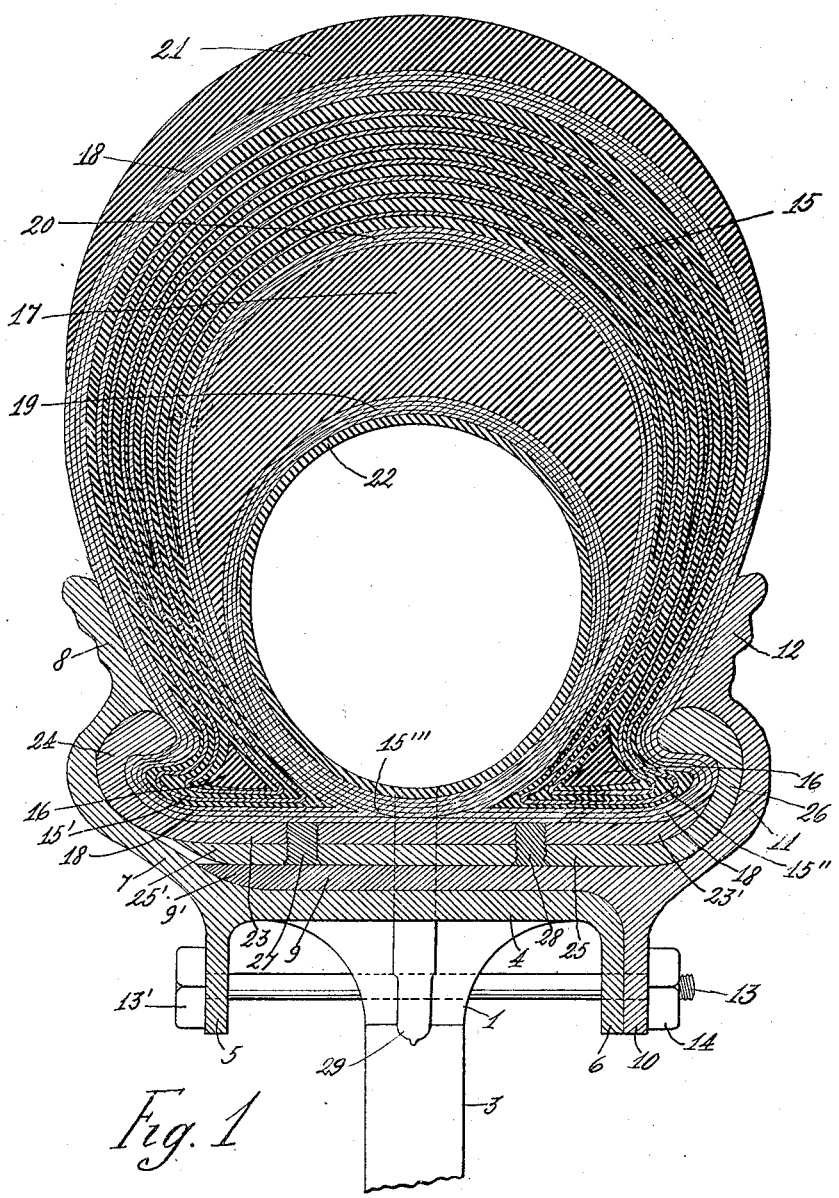

In the annexed drawings:

Fig. 1 is a cross-section of peripheral portion of a pneumatic tire carrying wheel provided with the improvements forming the subject-matter of this invention.

Figure 2:
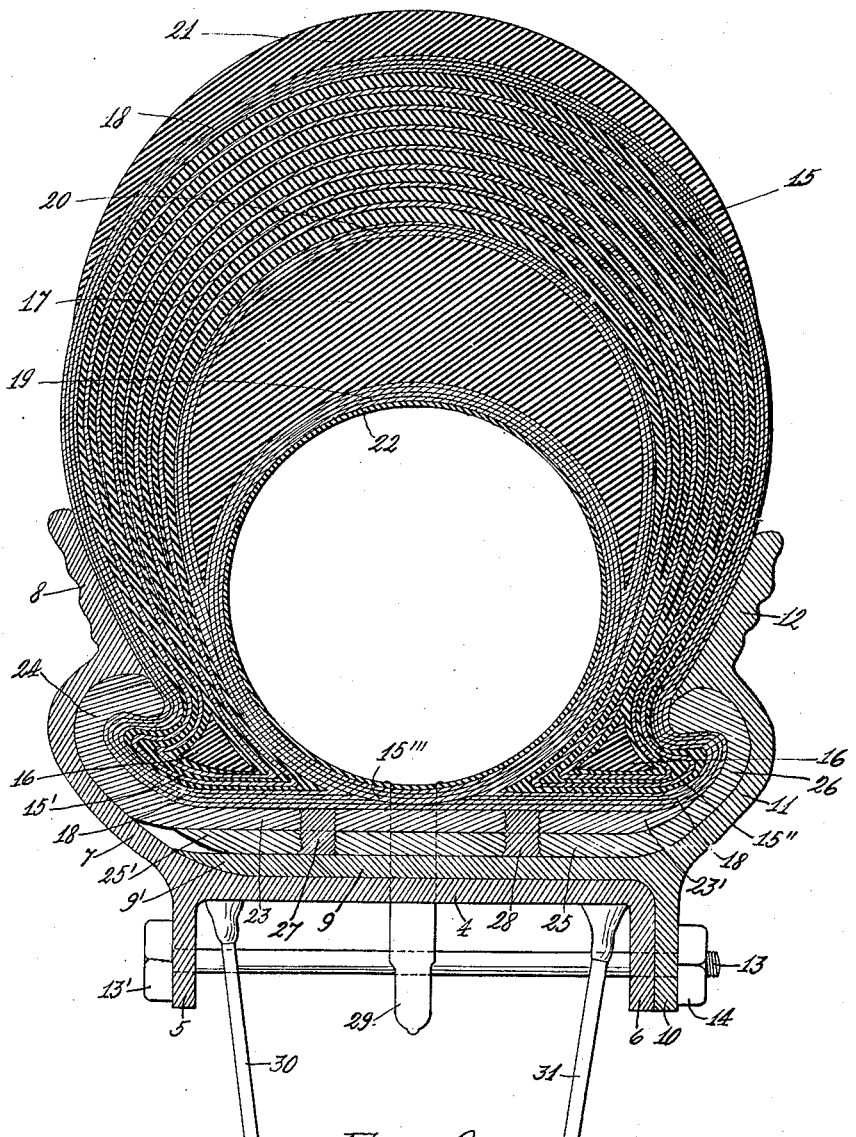

And Fig. 2 is a similar section of similar portion of wheel showing a slight modification.

This invention consists in providing a double rim for a wheel formed by a felloe 1 connected to spokes 3, that is a rim comprising two metallic rings superposed one on the other, namely, an inner ring 4 properly affixed to the wheel and which is provided with a flange 5 bent down at right angles to its inner edge and a similar flange 6 at its outer edge, and besides at the inner edge the rim is provided with an outwardly directed flange 7 of curved section forming an inwardly concave channel and terminating in a second flange 8 of plane shape or slightly curved in divergent upward direction, and another upper ring 9 provided at its outer edge with a flange 10 inwardly bent in right angle and a flange 11 upwardly directed and of curved section forming an inwardly concave channel and terminating in a second flange 12 of plane shape or slightly curved in divergent upward direction, and the inner edge of the upper ring 9 is of wedge shape 9' for fitting with the initial portion of flange 7 of lower ring 4. Both rings 4 and 9 are secured together by means of a plurality of bolts 13 provided with heads 13' and which pass through holes in the two lower flanges 5 and 6 of the lower ring and in the lower flange 10 of upper ring 9, they being secured in position by means of nuts 14 on the threaded ends of said bolts 13 so as to tighten the lower flange 10 of upper ring 9 against the lower flange 5 of the lower ring 4.

The pneumatic tire is formed of an ordinary body 15 made of overlying fabrics and caoutchouc layers and re-enforced at the lateral flanges with caoutchouc cords 16 and an inner body 17 of caoutchouc and of crescent section, both bodies being re-enforced with a thick and strong fabric forming an outer lining 18, an inner lining 19 and a divisional lining 20 between both bodies 15 and 17, and the outer fabric lining 18 is covered at its peripheral portion with a layer of caoutchouc 21 not very thick. In this tire the inner recess designed for lodging the air tube 22 is included within substantially the lower half of the total height of the tire in transverse section, owing to the superposed arrangement of the two solid bodies 15 and 17, and this tire is arranged with the air tube 22 within the same, on a demountable rim which is formed by two superposed metallic rings, namely an upper ring 23 having its outer edge slightly curved upwards and of wedge shape 23' and provided at its inner edge with an inward concavity outwardly directed channelled flange 24 arranged for fitting with a bead 15' of the pneumatic tire, and a lower ring 25 of wedged shape inner edge 25' and outer edge provided with inward concavity outwardly directed channelled flange 26 arranged for fitting with the other bead 15'' of the pneumatic tire, one ring fitting on the other one and both being secured together by means of two series of counter sunk screws 27 and 28 screwed on registering threaded holes formed in said rings 23 and 25. This transportable rim 23, 25 carrying the pneumatic tire 15 with the air tube 22, so that the air feeding tube 29 may be mounted through registering holes of rings 23 and 25, is mounted on ring 9 apart from the wheel and the whole is mounted on the stationary rim 4 of the wheel until the channelled flanges 24 and 26 may respectively fit in the channelled flanges 7 and 11 of rings 5 and 9, and then the screws 13 and nuts 14 are placed. Thus, the substantially plane flanges 8 and 12 serve for protecting and securing the lower portions of the sides of the tire, thus preventing the action of cutting strains on the inward portions 15''' of tire 15. The rings 5 and 9 are also provided with registering holes for receiving therethrough the tube 29 feeding air into tube 22.

In Fig. 2 is illustrated a modified form of wheel having two series of wires 30 and 31 instead of the felloe 1 and spokes 2, the lower inner flange 5 of ring 4 forming the stationary ring of the wheel not being omitted, and the ends of the wires 30 and 31 being rigidly fixed to the edges of ring 4.

In the described tire construction, the body of caoutchouc 17 forms a shell for the air tube 22 which is most efficient because any tack or nail that may have punctured through the two re-enforcements of fabric 18 and 20 and through the ordinary body 15 will be stopped by the solid caoutchouc impenetrable mass of body 17 covering the outer half of tube 22, while the inner half thereof is protected by the flanges 8 and 12 of rings 4 and 9 of the wheel rim.

It is obvious that the details of construction can be slightly varied without altering the spirit of the invention which is as pointed out in the appended claim.

What I claim is:

A tire comprising a pneumatic cushion, layers of reinforcing and cushioning material extending therearound, a solid annular cushion of crescent shaped cross-section on the outer periphery of said layers, reinforcing and cushioning layers extending around said pneumatic cushion, said first named layers and said solid cushion, beads, reinforcing and cushioning layers extending around said beads and also around the second named layers, and a solid annular tread cushion of crescent shaped cross-section on the periphery of the outermost of the third named layers.

In testimony whereof, I affix my signature hereunto.

ANDRES BALAGUER.